(12) United States Patent
Sangu et al.

(10) Patent No.: US 12,269,115 B2
(45) Date of Patent: Apr. 8, 2025

(54) LASER PROCESSING APPARATUS

(71) Applicant: SAMSUNG DISPLAY CO., LTD., Yongin-si (KR)

(72) Inventors: Akifumi Sangu, Hwaseong-si (KR); Hyoung-Joo Kim, Anyang-si (KR); Alexander Voronov, Suwon-si (KR); Eun Sun Choi, Seoul (KR); Gyoo Wan Han, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 281 days.

(21) Appl. No.: 16/657,222

(22) Filed: Oct. 18, 2019

(65) Prior Publication Data
US 2020/0180069 A1 Jun. 11, 2020

(30) Foreign Application Priority Data
Dec. 5, 2018 (KR) ........................ 10-2018-0155533

(51) Int. Cl.
*B23K 26/06* (2014.01)
*B23K 26/0622* (2014.01)
(Continued)

(52) U.S. Cl.
CPC ...... *B23K 26/0643* (2013.01); *B23K 26/0624* (2015.10); *B23K 26/0648* (2013.01);
(Continued)

(58) Field of Classification Search
CPC .............. B23K 26/046; B23K 26/0652; B23K 26/0643; B23K 26/0648; B23K 26/352;
(Continued)

(56) References Cited

U.S. PATENT DOCUMENTS

| 2,730,013 A | * | 1/1956 | Mandler | ............ G02B 17/0884 |
| | | | | 359/731 |
| 4,749,840 A | * | 6/1988 | Piwczyk | ................ B23K 26/02 |
| | | | | 219/121.76 |

(Continued)

FOREIGN PATENT DOCUMENTS

| CN | 101207058 | 6/2008 |
| CN | 103476537 | 12/2013 |

(Continued)

OTHER PUBLICATIONS

Deppo et al., A lightweight Schmidt space telescope configuration for ultra-high energy cosmic ray detection, ICSO 2018 (Year: 2018).*

(Continued)

*Primary Examiner* — Steven W Crabb
*Assistant Examiner* — Fahmida Ferdousi
(74) *Attorney, Agent, or Firm* — F. CHAU & ASSOCIATES, LLC

(57) ABSTRACT

A laser processing apparatus according to an exemplary embodiment includes: a light source generating a laser beam; and a light converging unit converging the laser beam to a focal point on an object to be processed, wherein the light converging unit includes a first optical element including a through hole penetrating the first optical element; a second optical element including a first region reflecting the laser beam and a second region transmitting the laser beam; and a third optical element including a focusing lens as a convex lens, a lower surface of the first optical element is a concave mirror, and an upper surface of the second optical element is convex and a lower surface thereof is concave.

20 Claims, 20 Drawing Sheets

(51) Int. Cl.
  *B23K 26/352* (2014.01)
  *G02B 5/10* (2006.01)
  *G02B 17/08* (2006.01)
  *G02B 19/00* (2006.01)
  *G02B 26/10* (2006.01)

(52) U.S. Cl.
  CPC .............. *B23K 26/352* (2015.10); *G02B 5/10* (2013.01); *G02B 17/0808* (2013.01); *G02B 19/0028* (2013.01); *G02B 26/101* (2013.01); *G02B 26/105* (2013.01)

(58) Field of Classification Search
  CPC ...... G02B 17/08; G02B 5/10; G02B 17/0808; G02B 19/0028; G02B 26/101; G02B 26/105; G02B 19/0014; G02B 27/14
  See application file for complete search history.

(56) References Cited

U.S. PATENT DOCUMENTS

| | | | |
|---|---|---|---|
| 5,449,882 A * | 9/1995 | Black | B23K 26/032 219/121.74 |
| 7,443,517 B2 | 10/2008 | Sawabe et al. | |
| 9,511,450 B2 | 12/2016 | Weick | |
| 2003/0112322 A1 * | 6/2003 | Tanaka | B23K 26/0738 347/256 |
| 2009/0050611 A1 | 2/2009 | Sukhman et al. | |
| 2013/0126751 A1 | 5/2013 | Mizoguchi et al. | |
| 2017/0072506 A1 * | 3/2017 | Kusaka | G02B 17/0808 |

FOREIGN PATENT DOCUMENTS

| | | |
|---|---|---|
| CN | 105710539 | 6/2016 |
| JP | S49-077597 | 7/1974 |
| JP | S5768811 A * | 4/1982 |
| JP | S57068811 * | 4/1982 |
| JP | 3655844 | 6/2005 |
| JP | 2011-125905 | 6/2011 |
| JP | 2011125905 A * | 6/2011 |
| JP | 2011-136499 | 7/2011 |
| JP | 2015-166094 | 9/2015 |
| JP | 2015166094 A * | 9/2015 |
| JP | 2017219642 A * | 12/2017 |
| KR | 10-1371265 | 3/2014 |
| KR | 10-2014-0052527 | 5/2014 |
| WO | 2012-073086 | 6/2012 |

OTHER PUBLICATIONS

Moore, Patrick (Jun. 26, 2002). More Small Astronomical Observatories. p. 229. ISBN 9781852335724. (Year: 2002).*
Fortworthastro.com/beginner5.html, 2017 (Year: 2017).*
Glassdynamics (Year: 2018).*
Ophiropt (Year: 2018).*
Phy217 (Year: 2017).*
Catadioptric system, Wikipedia article, 2017 (Year: 2017).*
thorlabs.com/newgrouppage9.cfm?objectgroup_id=6430, 2016 (Year: 2016).*
Catadioptric Cassegrain system, Wikipedia article, 2017 (Year: 2017).*
Machine translation of JP-2011125905-A (Year: 2011).*
Plane_geometry, wikipedia article (Year: 2017).*
European Search Report dated Mar. 26, 2020 in corresponding European Application No. 19213582.0 (9 pages).
Chinese Office Action dated Dec. 2, 2022 in corresponding Chinese Patent Application No. 201911220089.1 (7 pages), in Chinese.

* cited by examiner

LASER PROCESSING APPARATUS

CROSS-REFERENCE TO RELATED APPLICATION

This application claims priority to and the benefit of Korean Patent Application No. 10-2018-0155533 filed in the Korean Intellectual Property Office on Dec. 5, 2018, the entire contents of which are incorporated by reference herein.

BACKGROUND

(a) Field

The present disclosure relates to a laser processing apparatus.

(b) Description of the Related Art

As the demand high density, high integration, and high definition processing increases in the field of semiconductor and display manufacturing, the need for improved processing techniques is also growing. Laser processing techniques may be used for various purposes such as forming a groove on a surface of an object by irradiating a laser on the object, forming a dense layer inside the object, or changing a material characteristic of the object.

When super-precision processability is required, it is important to adjust the focal point position of the laser beam, which has the highest light energy and the smallest beam spot size, to be accurately positioned at the position which is to be processed in the object. However, when the laser beam is transmitted through a transmissive lens, chromatic aberration occurs due to a difference in refractive indexes between the wavelengths, and the position of the focal point changes according to the wavelength.

In some cases, laser processing techniques utilize pulse type lasers to achieve high instantaneous output. For these lasers, the spectral bandwidth of the laser beam has a tendency to broaden as the pulse duration becomes shorter. This may result in processing quality deterioration, defects in the object to be processed, or low productivity, due to the influence of chromatic aberration.

In addition, if a laser processing apparatus uses a lens and a mirror for refracting and reflecting a laser beam, it may not be impossible to process an accurate position in the object with the laser beam unless the distortion aberration is corrected.

The information disclosed in this Background section is only for enhancement of understanding of the background of the invention and therefore it may contain information that does not form prior art that is already known in this country to a person of ordinary skill in the art.

SUMMARY

Exemplary embodiments provide a laser processing apparatus with enhanced processing quality, processing precision, and productivity by preventing the position of a focal point for each wavelength of a laser beam from being changed by chromatic aberration, and with improved processing accuracy by providing a distortion aberration correction.

A laser processing apparatus according to an exemplary embodiment includes: a light source generating a laser beam; and a light converging unit converging the laser beam to a focal point on an object to be processed, wherein the light converging unit includes a first optical element including a through hole penetrating the first optical element; a second optical element including a first region reflecting the laser beam and a second region transmitting the laser beam; and a third optical element including a focusing lens as a convex lens, a lower surface of the first optical element is a concave mirror, and an upper surface of the second optical element is convex and a lower surface of the second optical element is concave.

The second optical element may include a central focusing hole penetrating the second optical element.

The third optical element may further include a supporting plate supporting the focusing lens.

The thickness of the supporting plate may be uniform, and the supporting plate may transmit the laser beam.

The central focusing hole maybe disposed within the first region, and the second region may surround the first region.

A size of the central focusing hole may be smaller than a size of the through hole.

A position adjustment unit disposed on a path of the laser beam generated from the light source and adjusting an irradiation position on the object to be processed of the laser beam may be further included, wherein the position adjustment unit may include a first galvano mirror determining the position on an x-axis of the focal point on the object to be processed and a second galvano mirror determining the position on a y-axis crossing the x-axis.

The laser beam may be a pulse type laser having a pulse duration of femtoseconds (e.g., less than one picosecond).

The object to be processed may include a non-activation region where the laser beam does not reach and an activation region where the laser beam reaches, and the activation region may include a central activation region disposed at a center part of the non-activation region, and a peripheral activation region disposed at a region surrounding the non-activation region.

A curvature of the first region and the second region of the second optical element may be larger than a curvature of the lower surface of the second optical element.

The curvature of the first region and the second region of the second optical element may be smaller than the curvature of the lower surface of the second optical element.

The curvature of the first region and the second region of the second optical element may be the same as the curvature of the lower surface of the second optical element.

The supporting plate may include a central hole exposing the focusing lens at the position overlapping the focusing lens.

A window disposed between the light converging unit and the object to be processed may be further included.

A laser processing apparatus according to an exemplary embodiment includes: a first optical element; a second optical element disposed between the first optical element and the object to be processed; and a focusing lens disposed between the first optical element and the object to be processed, wherein the lower surface of the first optical element is a concave mirror, the first optical element includes a through hole penetrating the first optical element, a curvature center of the upper surface of the second optical element and a curvature center of the lower surface of the second optical element are disposed between the second optical element and the object to be processed, the second optical element includes a central focusing hole penetrating the second optical element, the upper surface of the second optical element includes a first region reflecting the laser beam and a second region transmitting the laser beam, the lower surface of the second optical element transmits the laser beam, and the focusing lens overlaps the central focusing hole on a plan view.

A supporting plate supporting the focusing lens may be further included, and the supporting plate may transmit the laser beam.

The supporting plate may include a central hole at the region overlapping the focusing lens.

A position adjustment unit adjusting an irradiation position on the object to be processed of the laser beam may be further included, and the position adjustment unit may include a galvano mirror.

The central focusing hole may be disposed within the region overlapping the through hole on a plan view.

A window disposed between the supporting plate and the object to be processed may be further included.

According to the exemplary embodiments, the position of the focal point for each wavelength of the laser beam may be prevented from changing by the chromatic aberration, thereby processing quality, processing precision, and productivity of the laser processing apparatus may be improved, distortion aberration correction is possible, and then accuracy of the processing may be improved.

DETAILED DESCRIPTION OF THE EMBODIMENTS

Figure 1:
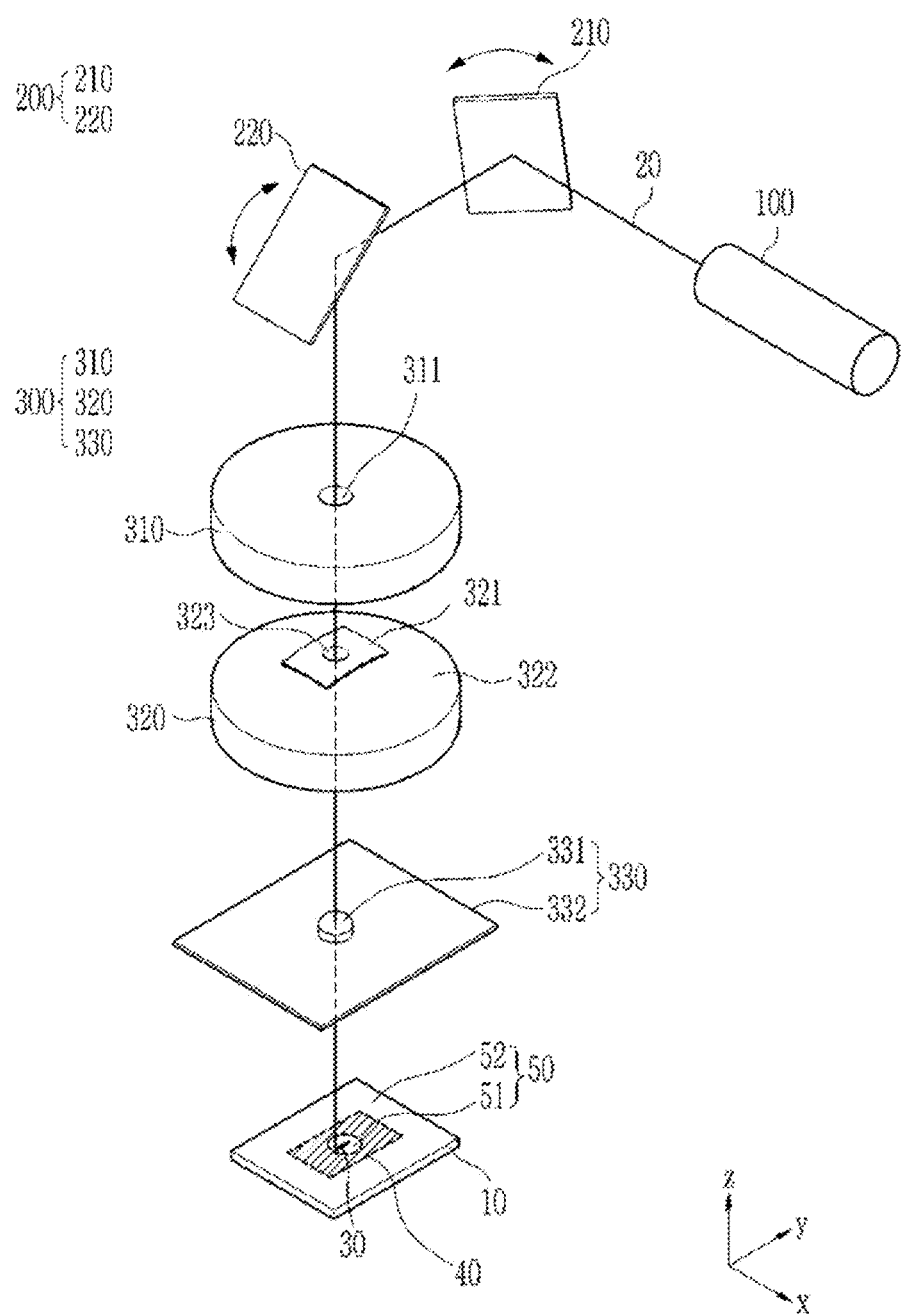
FIG. 1 is a schematic diagram showing a path of a laser beam irradiated from a laser processing apparatus to a central activation region according to an exemplary embodiment.

Several exemplary embodiments according to the present invention are described in detail with reference to the accompanying drawings to be easily executed by a person of ordinary skill in the art. The present invention can be embodied in several different forms, and is not limited to exemplary embodiments that are described herein.

In order to clearly describe the present invention, portions that are not connected with the description will be omitted. Like reference numerals designate like elements throughout the specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity. In the drawings, for better understanding and ease of description, the thickness of some layers and areas is exaggerated.

It will be understood that when an element such as a layer, film, region, or substrate is referred to as being "on" another element, it can be directly on the other element or intervening elements may also be present. By contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in the specification, the phrase "on a plane" means viewing the object portion from the top, and the phrase "on a cross-section" means viewing a cross-section of which the object portion is vertically cut from the side.

FIG. 1 describes the path of a laser beam 20 irradiated to a central activation region 51 in a laser processing apparatus according to an exemplary embodiment. The laser processing apparatus, according to an exemplary embodiment, includes a light source 100, a position adjustment unit 200, and a light converging unit 300.

The light source 100 generates the laser beam 20 for processing the object to be processed 10. The light source 100 may comprise an ultra-short pulse laser with a very high energy density, and may process the object to be processed 10. In some embodiments, light source 100 may have a pulse duration measured in nanoseconds, picoseconds, or even femtoseconds (i.e., less than a picosecond).

The object to be processed 10 may comprise one or more of various materials such that processing of the object to be processed 10 may not result in a physical chemical transformation or a processing precision deterioration due to heat diffusion. In an ultra-short pulse laser, by-products such as particle stacks and craters formed by the processing are not substantial. Therefore, in some cases the steps of removing these by-products (e.g., ultrasonic wave cleaning) may be omitted.

In addition, an ultra-short pulse laser is capable of processing materials with high heat transfer coefficients or low light absorption rates, and an object to be processed 10 comprising two or more materials and an object to be processed 10 comprising multi-layered composite materials may be processed with a single process. On the other hand, the light source 100 may generate a laser beam 20 beam other than the ultra-short pulse laser beam described above. For example, the laser beam 20 may be a pulse-type laser beam or a continuous wave laser beam having a pulse duration measured in nanoseconds.

The position adjustment unit 200 is positioned on the path of the laser beam 20 generated by the light source 100 and changes the path of the laser beam 20. The position adjustment unit 200 may include a first galvano mirror 210 and a second galvano mirror 220. The first galvano mirror 210 and the second galvano mirror 220 include a rotatable reflective mirror, and they scan the laser beam 20 within a predetermined angle range by rotation of the mirror.

The laser beam 20 produced from the light source 100 is reflected at a predetermined angle from the first galvano mirror 210. When the first galvano mirror 210 rotates based on one axis, the incidence angle of the laser beam 20 with the reflective surface of the first galvano mirror 210 changes and the path of the reflected laser beam 20 is determined accordingly.

After being reflected from the first galvano mirror 210, the laser beam 20 is reflected at a predetermined angle from the second galvano mirror 220. The rotational axis of the second galvano mirror 220 is positioned in a direction across the rotational axis of the first galvano mirror 210. Thus, the incidence angle of the laser beam 20 for the reflection surface of the second galvano mirror 220 is changed and the path of the reflected laser beam 20 are determined according to the rotation of the second galvano mirror 220. Accordingly, the path of the laser beam 20 may be determined, and the position of the focal point of the laser beam 20 formed on the object to be processed 10 may be adjusted by rotating the first galvano mirror 210 and the second galvano mirror 220.

When the object to be processed 10 is disposed on the xy plane in three dimensions made of the x-axis, the y-axis, and the z-axis, the first galvano mirror 210 may adjust the position on the x-axis of the focal point of the laser beam 20 formed on the object to be processed 10, and the second galvano mirror 220 may adjust the position on the y-axis of the focal point of the laser beam 20 formed on the object to be processed 10.

Thus, in one embodiment, the first galvano mirror 210 controls the irradiation position on the x-axis of the laser beam 20 and the second galvano mirror 220 controls the irradiation position on the y-axis. However, in other embodiments the first galvano mirror 210 may control the position on the y-axis and the second galvano mirror 220 may control the position on the x-axis. In addition, it is also possible that the position adjustment unit 200 does not include a plurality of galvano mirrors, and the position of the focal point on the x-axis and y-axis is simultaneously adjusted using a single galvano mirror.

According to the exemplary embodiment, a first controller (not shown) controlling the first galvano mirror 210 and a second controller (not shown) controlling the second galvano mirror 220 may be further included. The first controller and the second controller control the position and the angle of the first galvano mirror 210 and the second galvano mirror 220, respectively, so that the laser beam 20 is irradiated to the processing position.

The light converging unit 300 is disposed on the path of the laser beam 20 passing through the position adjustment unit 200, and concentrates the laser beam 20 to form the focal point on the object to be processed 10. The light converging unit 300 may be configured to direct a laser beam 20 onto an activation region 50 of the object to be processed 10 via multiple pathways using a minimum number of transmissive lenses. This enables the laser processing apparatus to irradiate the laser beam 20 to the center part of an object to be processed 10 and to correct any distortion aberration. For example, the laser beam 20 may be transmitted directly onto a central activation region 51 without being reflected within the light converging unit 300, or onto a peripheral activation region 52 following a path that includes being reflected within the light converging unit 300.

The light converging unit 300 includes a through-hole optical element 310 (i.e., a first optical element), a composite optical element 320 (i.e., a second optical element) disposed under the through-hole optical element 310, and a central focusing optical element 330 (i.e., a third optical element) disposed under the composite optical element 320.

The through-hole optical element 310 includes a through hole 311 penetrating from the upper surface of the through-hole optical element 310 to the lower surface. The laser beam 20 passes through the through hole 311 of the through-hole optical element 310. In some cases, the laser beam may be reflected back onto the lower surface of the optical element 310.

The composite optical element 320 is disposed on the path of the laser beam 20 passing through the through hole 311 of the through-hole optical element 310. The upper surface of the composite optical element 320 may be disposed to face the lower surface of the through-hole optical element 310. The upper surface of the composite optical element 320 is convex upward. The composite optical element 320 includes a first region 321 disposed at the center of the upper surface, a second region 322 disposed at the peripheral part of the first region 321, and a central focusing hole 323 penetrating from the upper surface of the composite optical element 320 to the lower surface.

The first region 321 of the composite optical element 320 is formed of a reflective layer, a reflective coating, or a reflective film to reflect the laser beam 20, and the second region 322 transmits the laser beam 20. The central focusing hole 323 may be disposed at the first region 321 of the composite optical element 320, and may be disposed within the region overlapping the through hole 311 of the through-hole optical element 310 on a plan view.

The size of the central focusing hole 323 may be smaller than the size of the through hole 311 of the through-hole optical element 310. For example, when the through hole 311 and the central focusing hole 323 have a circular shape, a diameter of the central focusing hole 323 maybe smaller than a diameter of the through hole 311 of the through-hole optical element 310.

The laser beam 20 passing through the through hole 311 of the through-hole optical element 310 may also pass through the composite optical element 320 through the central focusing hole 323. However, in some cases, the laser beam 20 may pass through the through hole 311 of the through-hole optical element 310 and then be reflected by the first region 321 of the composite optical element 320 onto the lower surface of the through-hole optical element 310. When the laser beam is reflected back onto the lower surface of the through-hole optical element 310, it may then be reflected again by the lower surface of the through-hole optical element 310 onto the second region 322 to be transmitted through the composite optical element 320 (i.e., en route to the peripheral activation region 52 of the object to be processed).

The central focusing optical element 330 is disposed between the composite optical element 320 and the object to be processed 10. The central focusing optical element 330 includes a focusing lens 331 disposed on the path of the laser beam 20 passing through the central focusing hole 323 of the composite optical element 320, and a supporting plate 332 disposed under the focusing lens 331.

The upper surface of the focusing lens 331 is convex. The upper surface of the focusing lens 331 may be disposed to face the lower surface of the composite optical element 320. The focusing lens 331 may overlap the central focusing hole 323 of the composite optical element 320 on a plan view.

The supporting plate 332 is disposed under the focusing lens 331 and supports the focusing lens 331. The supporting plate 332 may transmit light. The supporting plate 332 prevents contamination of the through-hole optical element 310, the composite optical element 320, and the focusing lens 331, which may occur during the processing, and may have a function of protecting the through-hole optical element 310, the composite optical element 320, and the focusing lens 331. The laser beam 20 passing through the central focusing hole 323 of the composite optical element 320 is concentrated while passing through the focusing lens 331 to form the focal point on the object to be processed 10.

According to an exemplary embodiment, the light converging unit 300 may further include an optical element moving apparatus (not shown) so that the through-hole optical element 310, the composite optical element 320, or the central focusing optical element 330 is movable. The through-hole optical element 310, the composite optical element 320, and the central focusing optical element 330 may be integrally movable or are independently movable by the optical element moving apparatus. As a result, the focal point may be more easily formed on the object to be processed 10 by adjusting the distance between the through-hole optical element 310 and the composite optical element 320, the distance between the composite optical element 320 and the central focusing optical element 330, or the distance between the composite optical element 320 and the object to be processed 10.

The laser beam 20 generated from the light source 100 and sequentially passing through the position adjustment unit 200 and the light converging unit 300 is concentrated to form the focal point on the object to be processed 10. The object to be processed 10 may be fixed on a stage (not shown) enabling multi-axis movement to adjust the relative position so that the focal point of the laser beam 20 may be disposed on the processing position of the object to be processed 10.

The object to be processed 10 includes an activation region 50 where the focal point of the laser beam 20 may be disposed, and a non-activation region 40 where the focal point may not be disposed. According to an exemplary embodiment, the laser processing apparatus is able to process a two-dimensional pattern on the activation region 50 by adjusting the path of the laser beam 20 with the position adjustment unit 200. A processing trace 30 is formed in the region where the focal point of the laser beam 20 passes over the object to be processed 10.

The activation region 50 includes the central activation region 51 and a peripheral activation region 52. The central activation region 51 may be disposed at the center part of the non-activation region 40. The laser beam 20 may form the focal point on the central activation region 51 of the object to be processed 10 (after the path is adjusted to sequentially pass through the through hole 311 of the through-hole optical element 310, the central focal point hole 323 of the composite optical element 320, and the focal point lens 331 of the central focal point optical element 330 by the position adjustment unit 200).

In some examples, the shape of the central activation region 51 may be circular. However, the shape of the central activation region 51 is not limited thereto, and the central activation region 51 may have various shapes such as a polygon or an ellipse, depending on the shape of the through hole 311, the central focusing hole 323, or the focusing lens 331. The peripheral activation region 52 and the non-activation region 40 are described in detail with reference to FIG. 2.

Figure 2:
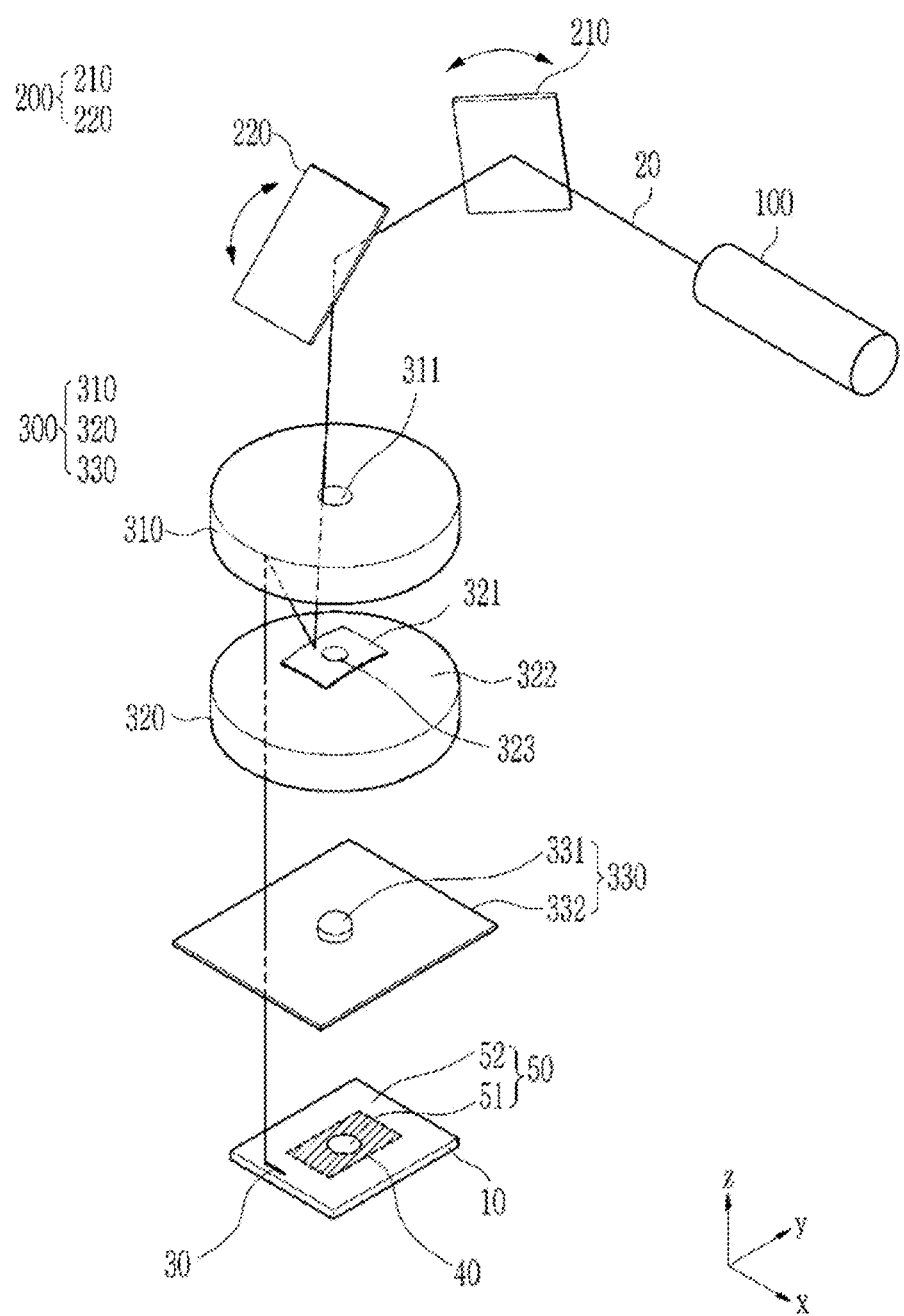
FIG. 2 is a schematic diagram of a path of a laser beam irradiated from a laser processing apparatus to a peripheral activation region according to an exemplary embodiment.

FIG. 2 is a schematic diagram representing a path of the laser beam 20 irradiated from the laser processing apparatus to the peripheral activation region 52 according to an exemplary embodiment. Except for the path of the laser beam 20, the basic configuration is similar to that described with reference to FIG. 1, and that the description for the corresponding elements is omitted.

According to the example shown in FIG. 2, the laser beam 20 generated from the light source 100 is reflected from the first galvano mirror 210 and the second galvano mirror 220 of the position adjustment unit 200 with a predetermined angle to pass through the through hole 311 of the through-hole optical element 310.

Unlike in FIG. 1, the path of the laser beam 20 is adjusted by the position adjustment unit 200 to reach the first region 321 without passing through the central focusing hole 323 of the composite optical element 320 in FIG. 2.

Thus, the laser beam 20 passing through the through hole 311 of the through-hole optical element 310 is reflected from the first region 321 of the composite optical element 320. The laser beam 20 reflected from the first region 321 of the composite optical element 320 is again reflected from the lower surface of the through-hole optical element 310 and passes through the composite optical element 320 in the second region 322 of the composite optical element 320. The laser beam 20 passing through the composite optical element 320 then passes through the supporting plate 332 of the central focusing optical element 330 to form the focal point on the object to be processed 10.

As described above, the object to be processed 10 may include a non-activation region 40 where the focal point of the laser beam 20 may not be disposed. The first region 321 of the composite optical element 320 does not transmit the laser beam 20 but reflects the laser beam 20 in the direction in which the through-hole optical element 310 is disposed. As a result, the focal point may not be disposed in the partial region of the object to be processed 10 corresponding to the first region 321.

The non-activation region 40 may have a shape corresponding to the first region 321 of the composite optical element 320 projected onto the object to be processed 10. For example, if the first region 321 of the composite optical element 320 has a long rectangular shape in the y-axis direction, the non-activation region 40 of the object to be processed 10 may also have a long rectangular shape in the y-axis direction. However, the shape of the non-activation region 40 may not exactly coincide with the shape in which the first region 321 of the composite optical element 320 projected on the object to be processed 10 due to reflection and refraction of the laser beam 20 (i.e., it may be a distorted version of the shape of the first region 321). Since the region to be processed on the object to be processed 10 is not included in the non-activation region 40, the position, the size, or the shape of the first region 321 may be determined depending on the position, the size, and the shape to be processed.

The laser beam 20 may form a focal point on the peripheral activation region 52 after it is sequentially reflected from the first region 321 of the composite optical element 320 and the lower surface of the through-hole optical element 310, passing through the second region 322 and the supporting plate 332 of the composite optical element 320. Since the second region 322 of the composite optical element 320 through which the laser beam 20 is passed is disposed on the peripheral part of the first region 321, the peripheral activation region 52 of the object to be processed 10 may be disposed on the region enclosing the non-activation region 40.

Next, the through-hole optical element 310 is described in detail with reference to FIG. 3 to FIG. 6.

Figure 3:
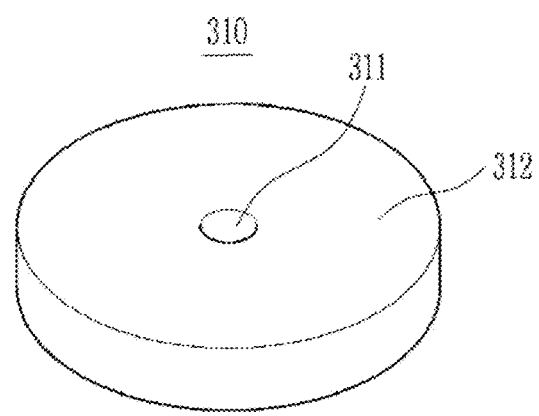
FIG. 3 is a perspective view of a through-hole optical element according to an exemplary embodiment when viewed from above.

FIG. 3 is a perspective view of a through-hole optical element 310 according to an exemplary embodiment when viewed from above. Referring to FIG. 3, the through-hole optical element 310 includes the through hole 311 penetrating the upper surface to the lower surface, and the upper surface of the through-hole optical element 310 includes a flat part 312 that is flat.

As described in FIG. 1 and FIG. 2, the laser beam 20 passes through the position adjustment unit 200, through the through-hole optical element 310 via the through hole 311 without being refracted. As a result, the laser beam is not directly incident on the flat part 312 of the through-hole optical element 310.

Figure 4:
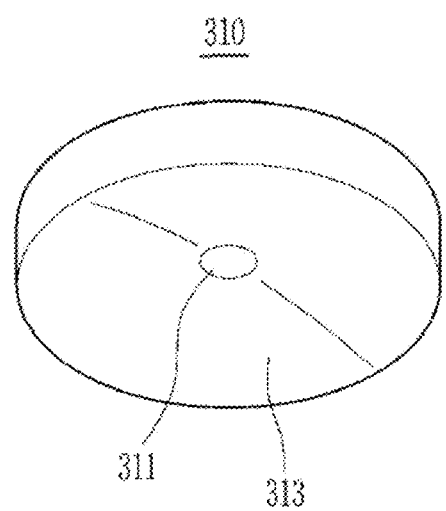
FIG. 4 is a perspective view of a through-hole optical element according to an exemplary embodiment when viewed from below.

FIG. 4 is a perspective view of a through-hole optical element 310 according to an exemplary embodiment when viewed from below. Referring to FIG. 4, the lower surface of the through-hole optical element 310 includes the through hole 311 penetrating from the upper surface of the through-hole optical element 310 and a first recess portion 313 disposed at the peripheral part of the through hole 311. The first recess portion 313 forms the lower surface of the through-hole optical element 310, and has a concave shape. The first recess portion 313 may be a concave mirror. Thus, a laser beam entering the diagonal line from the first recess portion 313 is reflected in a converging direction without spreading.

In some embodiments, the first recess portion 313 of the through-hole optical element 310 may be a spherical concave mirror with the reflection surface as the inner surface of the sphere. However, according to an exemplary embodiment, the first recess portion 313 of the through-hole optical element 310 may be an aspherical concave mirror. In an aspherical concave mirror, the spherical aberration is reduced compared to the spherical concave mirror, thereby allowing more precise processing.

Figure 5:
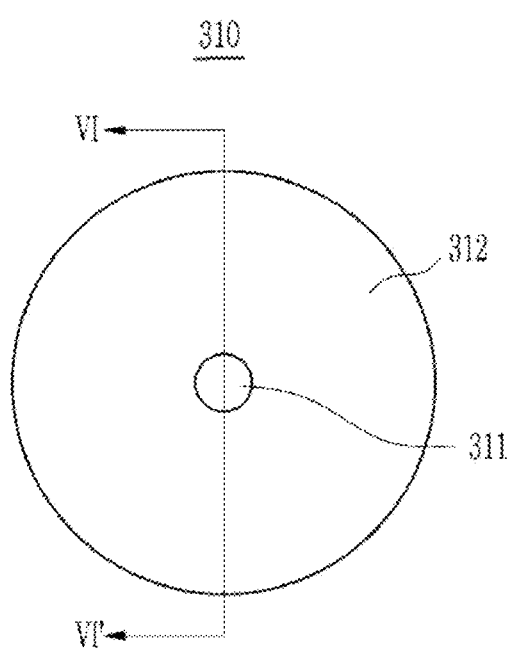
FIG. 5 is a top plan view of a through-hole optical element according to an exemplary embodiment.

FIG. 5 is a top plan view of a through-hole optical element 310 according to an exemplary embodiment. Referring to FIG. 5, the flat part 312 of the through-hole optical element 310 is circular. However, according to an exemplary embodiment, the flat part 312 of the through-hole optical element 310 may be an ellipse, a polygon, or any other shape.

The through hole 311 is disposed at the center of the flat part 312 in the plan view of the through-hole optical element 310. However, the through hole 311 may be disposed at any position in a plan view without being disposed at the center of the flat part 312. In some embodiments, the through-hole 311 of the through-hole optical element 310 is circular. However, the through hole 311 may be an ellipse, a polygon, or any other shape.

Figure 6:
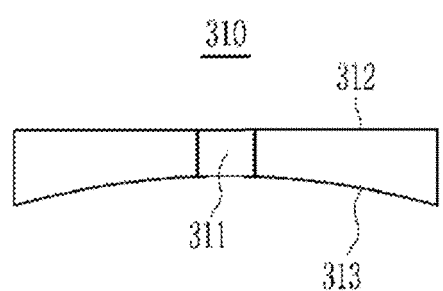
FIG. 6 is a cross-sectional view of a through-hole optical element shown in FIG. 5 taken along a line VI-VI'.

A cross-sectional view of the through-hole optical element 310 is now described with reference to FIG. 6. FIG. 6 is a cross-sectional view of a through-hole optical element shown in FIG. 5 taken along a line VI-VI'.

As described above, the flat part 312 of the through-hole optical element 310 is flat and the first recess portion 313 has a concave shape. Thus, the through-hole optical element 310 becomes thinner toward the center. In other words, the thickness of the corner portion of the through-hole optical element 310 is thickest than the thickness of the central portion. The through-hole optical element 310 includes the through hole 311 penetrating the upper surface to the lower surface.

Next, the composite optical element 320 is described in detail with reference to FIG. 7 to FIG. 10.

Figure 7:
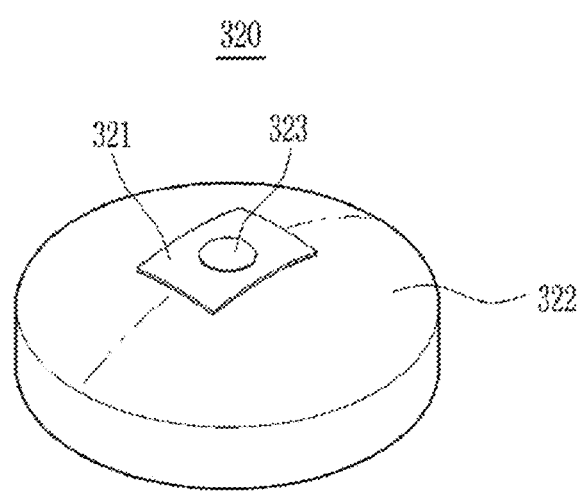
FIG. 7 is a perspective view of a composite optical element according to an exemplary embodiment when viewed from above.

FIG. 7 is a perspective view of a composite optical element 320 according to an exemplary embodiment when viewed from above. Referring to FIG. 7, the upper surface of the composite optical element 320 has a convex shape. The composite optical element 320 has a first region 321 disposed at the center of the upper surface of the composite optical element 320, a second region 322 disposed at the peripheral portion of the first region 321, and a central focusing hole 323 penetrating the upper surface to the lower surface of the composite optical element 320. The central focusing hole 323 may be disposed within the first region 321.

The first region 321 reflects the laser beam and the second region 322 transmits the laser beam. Thus, the first region 321 serves as a convex mirror and the second region 322 serves as a convex lens. The second region 322 of the composite optical element 320 is formed of a convex lens on the upper surface so that the laser beam incident on the second region 322 may be condensed without spreading. The first region 321, which is a convex mirror, and the second region 322, which is disposed on the peripheral part of a convex mirror, may be integrally formed.

The upper surface may be formed by applying a highly reflective coating at the center of the convex lens to form the first region 321 and the second region 322 of the composite optical element 320. However, the composite optical element 320 may be formed by any method that produces the characteristic that the laser beam 20 is reflected in the first region 321 and the laser beam 20 is transmitted in the second region 322.

In some embodiments, the upper surface of the composite optical element 320 may be spherical. However, according to an exemplary embodiment, the upper surface of the composite optical element 320 may be aspherical. If the upper surface of the composite optical element 320 is an aspherical surface, the spherical aberration may be reduced as compared with the case of the spherical surface, thereby enabling more precise processing.

Figure 8:
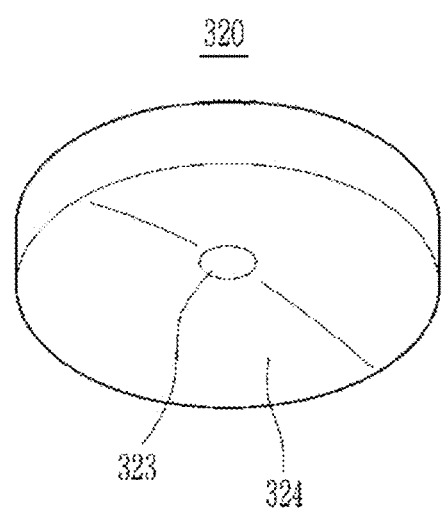
FIG. 8 is a perspective view of a composite optical element according to an exemplary embodiment when viewed from below.

FIG. 8 is a perspective view of a composite optical element 320 according to an exemplary embodiment when viewed from below. Referring to FIG. 8, the lower surface of the composite optical element 320 has a concave shape, and includes a central focusing hole 323 penetrating from the upper surface of the composite optical element 320 at the center. The lower surface of the composite optical element 320 includes a second recess portion 324 positioned on the peripheral portion of the central focusing hole 323. The second recess portion 324 transmits the laser beam 20, unlike the first recess portion 313 of the through-hole optical element 310. In some embodiments, the second recess portion 324 may be spherical. However, according to the exemplary embodiment, the second recess portion 324 may be aspherical.

Figure 9:
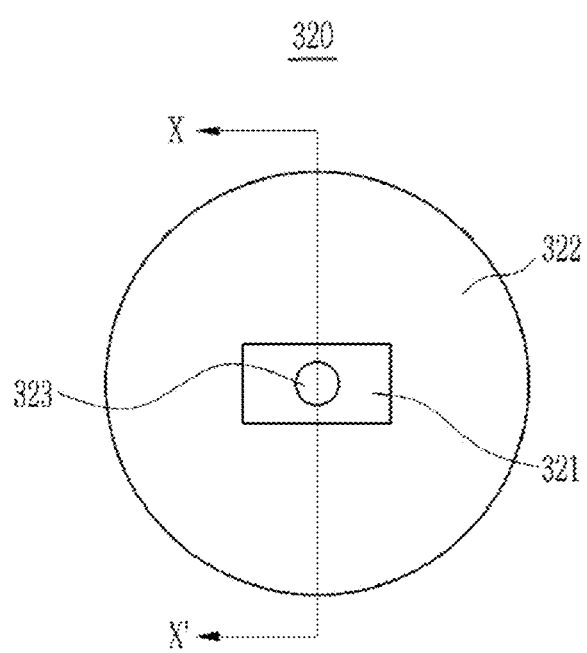
FIG. 9 is a top plan view of a composite optical element according to an exemplary embodiment.

FIG. 9 is a top plan view of a composite optical element 320 according to an exemplary embodiment. Referring to FIG. 9, the upper surface of the composite optical element 320 is shown with a circular shape. However, the shape of the composite optical element 320 in a plan view may be any shape including an ellipse or a polygon.

The first region 321, which reflects the laser beam 20, is disposed at the center of the upper surface of the composite optical element 320. In some examples, the first region 321 is rectangular. However, this is an example, and the first region 321 may be any shape including a circle, an ellipse, or a polygon. As described above, the position, the size, or the shape of the first region 321 may be determined depending on the position, the size, and the shape to be processed on the object to be processed 10.

In some embodiments, the central focusing hole 323 is disposed at the center of the first region 321 in a plan view of the composite optical element 320. However, the central focusing hole 323 is not always disposed at the center of the first region 321, but can be disposed at any position in a plan view. In some embodiments, the central focusing hole 323 of the composite optical element 320 is circular. However, according to an exemplary embodiment, the shape of the central focusing hole 323 may be an ellipse, a polygon, or any other shape.

Figure 10:
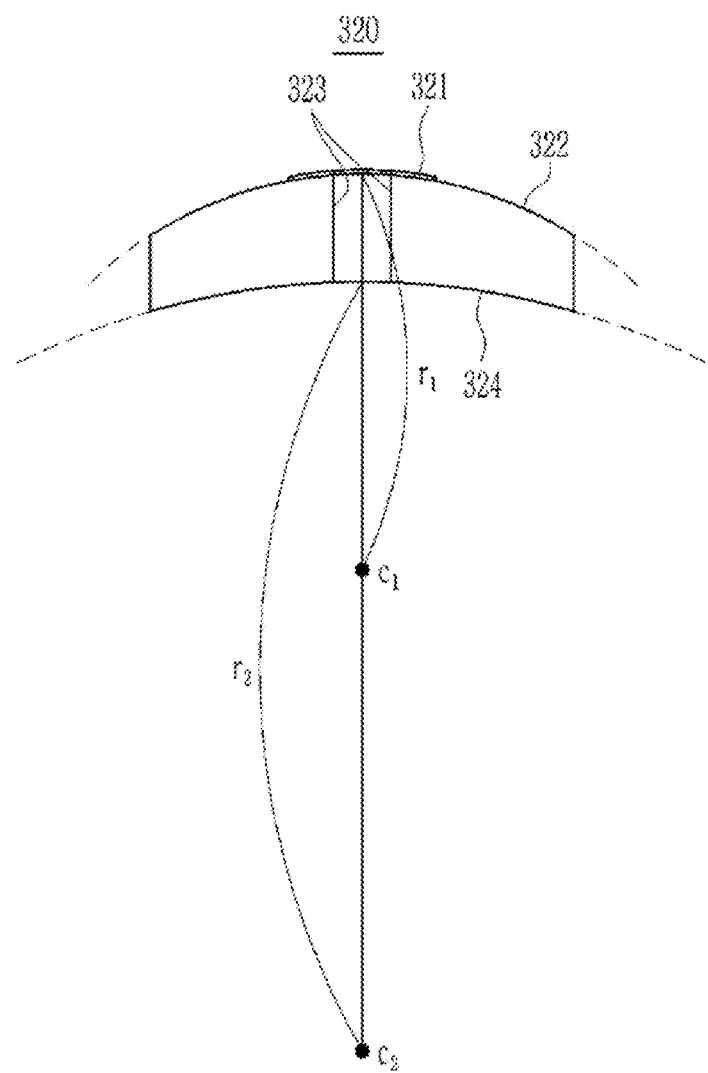
FIG. 10 is a cross-sectional view of a composite optical element of FIG. 9 taken along a line X-X'.

A cross-sectional view of the composite optical element 320 is now described with reference to FIG. 10. FIG. 10 is a cross-sectional view of a composite optical element of FIG. 9 taken along a line X-X'.

The upper surface of the composite optical element 320 is convex and the lower surface is concave. A curvature center c1 for the upper surface of the composite optical element 320 and a curvature center c2 for the lower surface both are formed under the composite optical element 320.

In some embodiments, the curvature of the upper surface of the composite optical element 320 is larger than the curvature of the lower surface. That is, the curvature of the first region 321 and the second region 322 of the composite optical element 320 is larger than the curvature of the second recess portion 324. Since the curvature radius is inversely proportional to the curvature, the curvature radius r1 of the first region 321 and the second region 322 of the composite optical element 320 is smaller than the curvature radius r2 of the second recess portion 324. The curvature refers to a change rate representing a bending degree of a curved line, and the curvature radius refers to a distance from an arbitrary position on the curved line to the curvature center.

As a result, the composite optical element 320 becomes thicker from the edge toward the center. Thus, according to one embodiment, the composite optical element 320 may be the thinnest at the edge and the thickest at the center.

However, it is also possible for the curvature of the first region 321 and the second region 322 of the composite optical element 320 to be equal to the curvature of the second recess portion 324, or for the curvature of the first region 321 and the second region 322 to be smaller than the curvature of the second recess portion 324. In other words, it is also possible for the curvature radius r1 of the first region 321 and second region 322 of the composite optical element 320 to be equal to the curvature radius r2 of the second recess portion 324, or for the curvature radius r1 of the first region 321 and the second region 322 to be greater than the curvature radius r2 of the second recess portion 324. In this case, the composite optical element 320 may have a uniform thickness, or the composite optical element 320 may thicker at the edge than at the center.

The central focusing optical element 330 is now described in detail with reference to FIG. 11 and FIG. 12.

Figure 11:
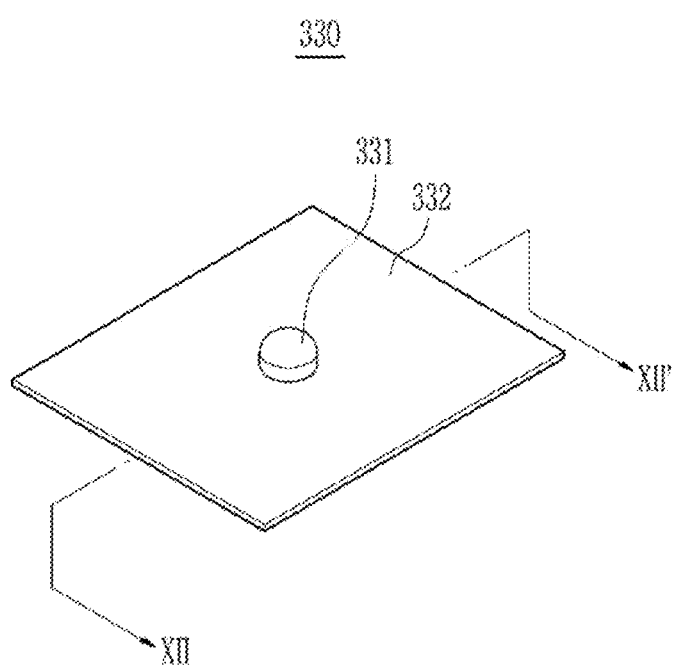
FIG. 11 is a perspective view of a central focusing optical element according to an exemplary embodiment when viewed from above.
Figure 12:
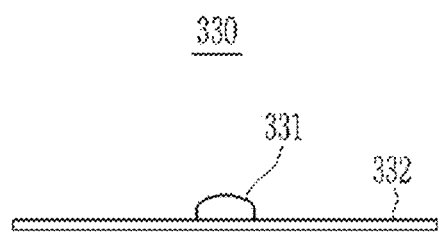
FIG. 12 is a cross-sectional view of a central focusing optical element of FIG. 11 taken along a line XII-XII'.

FIG. 11 is a perspective view of a central focusing optical element 330 according to an exemplary embodiment when viewed from above.

The central focusing optical element 330 includes the focusing lens 331 and the supporting plate 332. The focusing lens 331 is a convex lens with a convex upper surface. Therefore, a laser beam incident on the focusing lens 331 passes through the focusing lens 331 and is refracted in the converging direction without spreading. In some embodiments, the upper surface of the focusing lens 331 may be spherical. However, according to an exemplary embodiment, the upper surface of the focusing lens 331 may be aspherical. In some embodiments, the focusing lens 331 may be disposed on the center part of the supporting plate 332. However, it is not limited thereto, and it may be disposed on any part of the supporting plate 332.

The supporting plate 332 has flat upper and lower surfaces, is disposed under the focusing lens 331, and supports the focusing lens 331. The supporting plate 332 may transmit the laser beam. Although the supporting plate 332 is shown as quadrangular in a plan view, the supporting plate 332 may be formed with any shape such as a circle, a polygon, or the like.

The cross-sectional view of the central focusing optical element 330 is now described with reference to FIG. 12. FIG. 12 is a cross-sectional view of a central focusing optical element of FIG. 11 taken along a line XII-XII'.

The focusing lens 331 may have a convex upper surface and a flat lower surface. The lower surface of the focusing lens 331 may be attached or fixed to the flat supporting plate 332. The thickness of focusing lens 331 increases from the edge to the center. The focusing lens 331 is the thinnest at the edge and the thickest at the center.

The thickness of the supporting plate 332 may be constant. In some embodiments, the focusing lens 331 and the supporting plate 332 may be separately manufactured and then attached and fixed, however the focusing lens 331 and the supporting plate 332 may also be integrally formed.

The path of the laser beam passing through the light converging unit 300 to form the focal point in the central activation region 51 is described with reference to FIG. 13.

Figure 13:
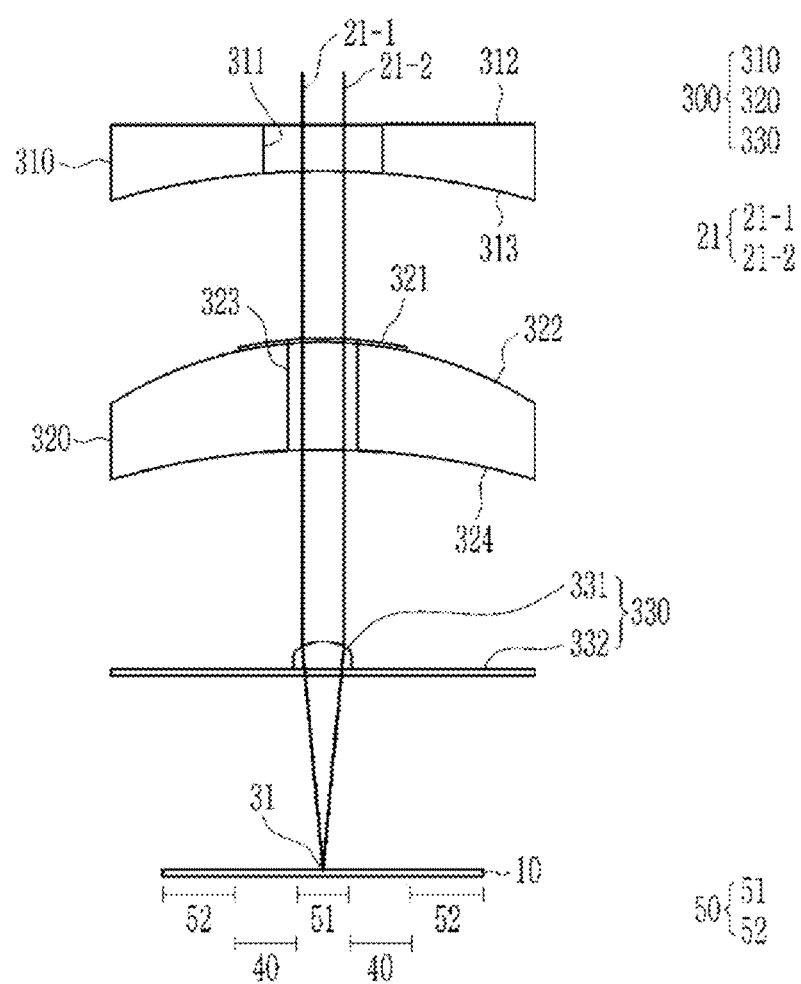
FIG. 13 is a diagram explaining a light converging unit forming a focal point of a laser beam on a central activation region.

FIG. 13 is a diagram for explaining a light converging unit 300 forming a focal point of a laser beam on a central activation region 51. FIG. 13 shows the path of a first laser beam 21 having the adjusted path so that the focal point is formed on a focal point position 31 of the object to be processed 10.

First, the path of the first laser beam 21 is described through the path of a first line beam 21-1 and a second line beam 21-2. The first laser beam 21 is a group of a number of line beams, and the first line beam 21-1 and the second line beam 21-2 among them are typically described.

The first line beam 21-1 and the second line beam 21-2 pass the through-hole optical element 310 through the through hole 311. The through hole 311 penetrates the upper surface to the lower surface of the through-hole optical element 310, so that the first line beam 21-1 and the second line beam 21-2 proceed without being refracted when passing through the through hole 311.

The first line beam 21-1 and the second line beam 21-2 passing through the through hole 311 pass through the composite optical element 320 through the central focusing hole 323 of the composite optical element 320. Since the central focusing hole 323 penetrates from the upper surface to the lower surface of the composite optical element 320, the first line beam 21-1 and the second line beam 21-2 proceed without refraction when passing through the central focusing hole 323. In some embodiments, the center of the through hole 311 may coincide with the center of the central focusing hole 323 in a plan view. However, it is not limited thereto, and the central focusing hole 323 may be disposed anywhere within the region overlapping the through hole 311 in a plan view.

The first line beam 21-1 and the second line beam 21-2 pass through the composite optical element 320 via the central focusing hole 323 and are transmitted through the focusing lens 331 and the supporting plate 332 of the central focusing optical element 330. The center of the central focusing hole 323 may coincide with the center of the focusing lens 331 in a plan view. Also, the center of the through hole 311, the central focusing hole 323, and the focusing lens 331 may be disposed on a straight line. However, it is not limited thereto, and the focusing lens 331 may be disposed anywhere within the region overlapping the central focusing hole 323 in a plane. Since the focusing lens 331 is a convex lens with the convex upper surface, the first line beam 21-1 and the second line beam 21-2 begin to converge while being transmitted through the focusing lens 331 to form the focal point at the focal point position 31 of the object to be processed 10.

When the supporting plate 332 and the focusing lens 331 are integrally formed with the same material, there is no boundary between the supporting plate 332 and the focusing lens 331, so that the first line beam 21-1 and the second line beam 21-2 in the central focusing optical element 330 are not refracted. However, when the supporting plate 332 and the focusing lens 331 include different materials and the focusing lens 331 is attached and fixed to the supporting plate 332, the first line beam 21-1 and the second line beam 21-2 may be refracted on the boundary of the supporting plate 332 and the focusing lens 331. But since the upper surface and the lower surface of the supporting plate 332 are parallel, the supporting plate 332 does not function to condense or disperse the first laser beam 21.

The object to be processed 10 includes the activation region 50 where the focal point may be formed, and the non-activation region 40 where the focal point may not be formed. The activation region 50 includes the central activation region 51 and the peripheral activation region 52. The first laser beam 21 passes through the central focusing hole 323 positioned at the center part of the first region 321, and transmits through the focusing lens 331 to form the focal point so that the focal point position 31, in which the focal point of the first laser beam 21 is formed, is disposed at the central activation region 51.

The path of the laser beam forming the focal point within the peripheral activation region 52 by passing through the light converging unit 300 is now described with reference to FIG. 14.

Figure 14:
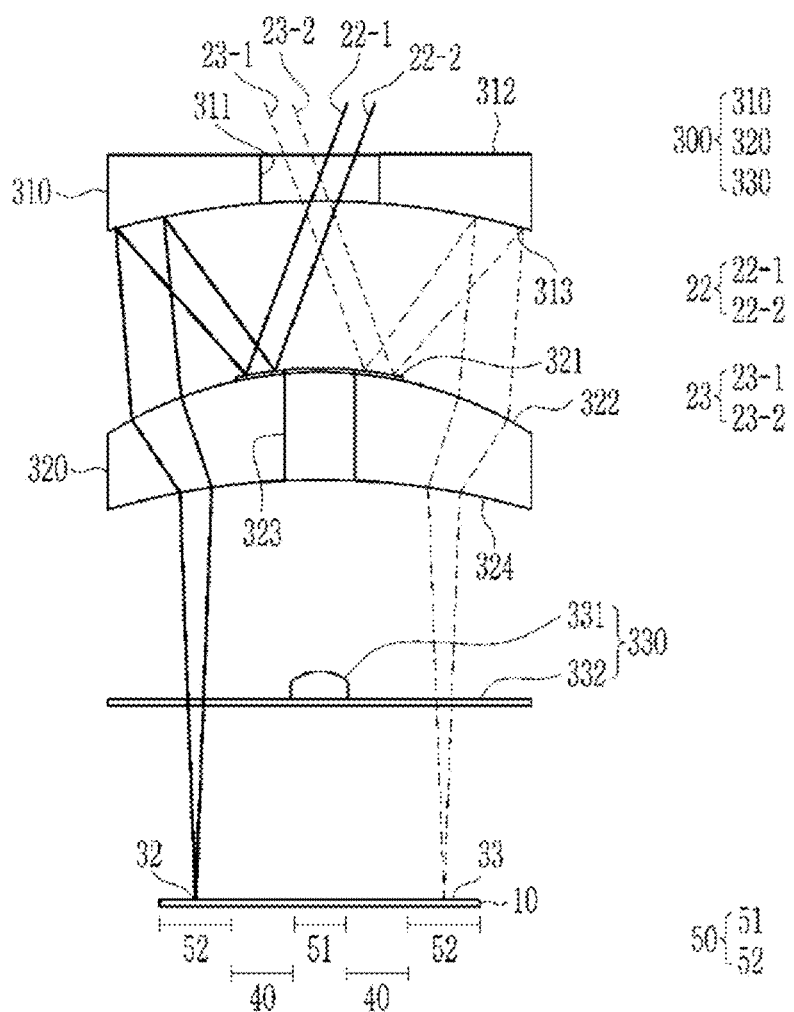
FIG. 14 is a diagram explaining a light converging unit forming a focal point of a laser beam on a peripheral activation region.

FIG. 14 is a diagram explaining a light converging unit forming a focal point of a laser beam on a peripheral activation region 52. FIG. 14 shows the path of a second laser beam 22 and a third laser beam 23 of which the paths are adjusted so that the focal points are formed at a first focal point position 32 and a second focal point position 33 of the object to be processed 10.

First, the path of the second laser beam 22 is described through the path of a third line beam 22-1 and a fourth line beam 22-2. The second laser beam 22 may include numerous line beams, of which the third line beam 22-1 and the fourth line beam 22-2 are examples. Although FIG. 14 illustrates only the third line beam 22-1 and the fourth line beam 22-2, the second laser beam 22 may include more line beams.

The third line beam 22-1 and the fourth line beam 22-2 pass through the through-hole optical element 310 via the through hole 311. The through hole 311 passes through the upper surface and the lower surface of the through-hole optical element 310, so that the third line beam 22-1 and the fourth line beam 22-2 proceed without being refracted when passing through the through hole 311.

The third line beam 22-1 and the fourth line beam 22-2, passing through the through-hole optical element 310 via the through hole 311, are then reflected at the first region 321, disposed at the peripheral part of the central focusing hole 323 of the composite optical element 320. Since the first region 321 is a convex mirror, the third line beam 22-1 and the fourth line beam 22-2, reflected from the first region 321, proceed in a direction toward the outer part of the composite optical element 320 further than when reflected from a plane mirror.

The third line beam 22-1 and the fourth line beam 22-2 reflected from the first region 321 are reflected again at the first recess portion 313 of the through-hole optical element 310. Since the first recess portion 313 is a concave mirror, the third line beam 22-1 and the fourth line beam 22-2 reflected from the first recess portion 313 proceed in a direction toward the center of the first recess portion 313 further than when reflected by the plane mirror.

The third line beam 22-1 and the fourth line beam 22-2 reflected from the first recess portion 313 pass through the second region 322 of the composite optical element 320. Since the second region 322 is convex, the third line beam 22-1 and the fourth line beam 22-2 are refracted in the direction toward the center of the composite optical element 320 due to the refractive index difference of the medium.

The third line beam 22-1 and the fourth line beam 22-2 incident on the second region 322 of the composite optical element 320 are emitted through the second recess portion 324, which is the lower surface of the composite optical element 320. Since the second recess portion 324 has a concave shape, the third line beam 22-1 and the fourth line beam 22-2 are refracted in a direction toward the outer portion of the composite optical element 320.

The third line beam 22-1 and the fourth line beam 22-2 pass through the supporting plate 332 of the central focusing optical element 330 and are condensed at the first focal point position 32 on the object to be processed 10 to form the focal point. Although not shown, the third line beam 22-1 and the fourth line beam 22-2 may be incident on the supporting plate 332 and may be refracted by the medium difference when being emitted. However, since the upper surface and the lower surface of the supporting plate 332 are parallel, the incident angle of the third line beam 22-1 and the fourth line beam 22-2 incident on the upper surface of the supporting plate 332 and the emission angle of the third line beam 22-1 and the fourth line beam 22-2 emitted to the lower surface of the supporting plate 332 are the same. In other words, the supporting plate 332 does not serve to condense or disperse the second laser beam 22.

When using only a reflective mirror to prevent chromatic aberration, beam uniformity is limited due to the influence of a spherical aberration. However, according to exemplary embodiments, the laser processing apparatus may prevent chromatic aberration by using both the reflection mirror and the transmission lens. Furthermore, the lens surface may provide aberration compensation, thereby improving beam uniformity and beam quality.

Hereinafter, the path of a fifth line beam 23-1 and a sixth line beam 23-2 is described to illustrate the path of the third laser beam 23. The detailed description of the same contents as described for the second laser beam 22 is omitted.

The third laser beam 23 is path-adjusted to form the focal point at the second focal point position 33. As with the line beams of the second laser beam 22, the fifth line beam 23-1 and the sixth line beam 23-2 pass through the through-hole optical element 310 via the through hole 311 and are reflected in the first region 321 disposed at the peripheral part of the central focusing hole 323 of the composite optical element 320. The fifth line beam 23-1 and the sixth line beam 23-2 are reflected from the first region 321 and are reflected again at the first recess portion 313 of the through-hole optical element 310. Then, they pass through the second region 322 and the second recess portion 324 of the composite optical element 320 and are refracted accordingly. The fifth line beam 23-1 and the sixth line beam 23-2 are then transmitted through the supporting plate 332 of the central focusing optical element 330 and are condensed at the second focal point position 33 on the object to be processed 10 to form the focal point.

Although the fifth line beam 23-1 and the sixth line beam 23-2 are described as an example, the third laser beam 23 may include more line beams.

Unlike FIG. 13, the first focal point position 32 and the second focal point position 33, at which the focal point of the second laser beam 22 and the third laser beam 23 are formed, are disposed in the peripheral activation region 52.

The first region 321 of the composite optical element 320 does not transmit the laser beams but reflects the laser beams in the direction in which the through-hole optical element 310 is disposed. The laser beams reflected from the first recess portion 313 of the through-hole optical element 310 passes through the second region 322 disposed at the peripheral part of the first region 321 of the composite optical element 320 to form the focal point. As a result, the focal point may not be disposed in the non-activation region 40 of the object to be processed 10, which is disposed below the first region 321, and the focal point may be positioned in the peripheral activation region 52, which is the region surrounding the non-activation region 40.

The non-activation region 40 may have the same shape as the first region 321 as the first region 321 of the composite optical element 320 is projected. However, the non-activation region 40 may not have the shape that exactly coincides with the shape of the first region 321 of the composite optical element 320 due to the reflection and refraction of the laser beam 20, and the shape of the non-activation region 40 may be a partially distorted shape of the first region 321. The position, the size, or the shape of the first region 321 may be determined depending on the position, the size, and the shape to be processed on the object to be processed 10.

Figure 15:
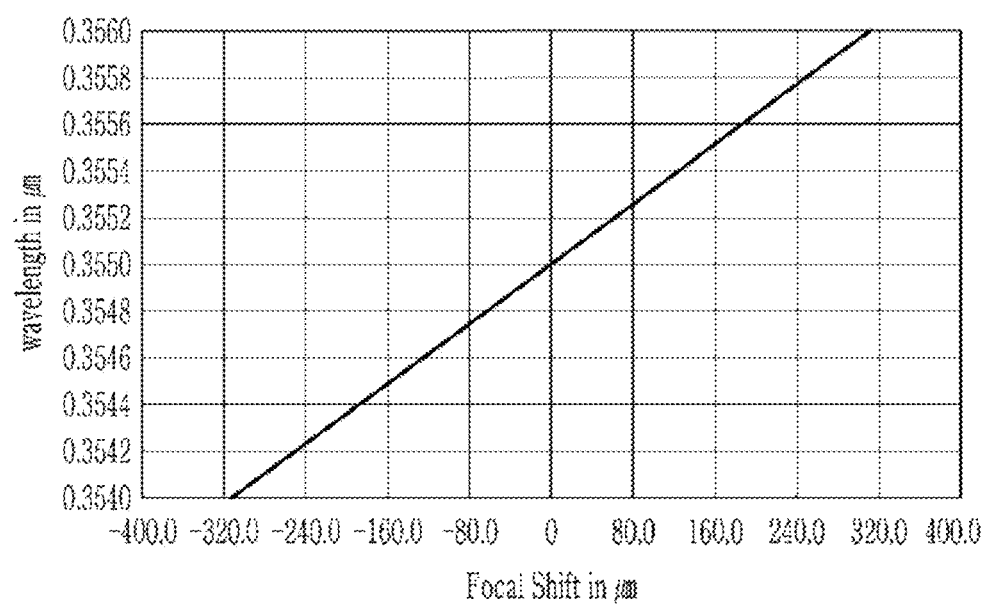
FIG. 15 is a graph showing a movement distance of a focal point depending on a wavelength of a laser beam of a laser processing apparatus using a transmissive lens according to a comparative example.
Figure 16:
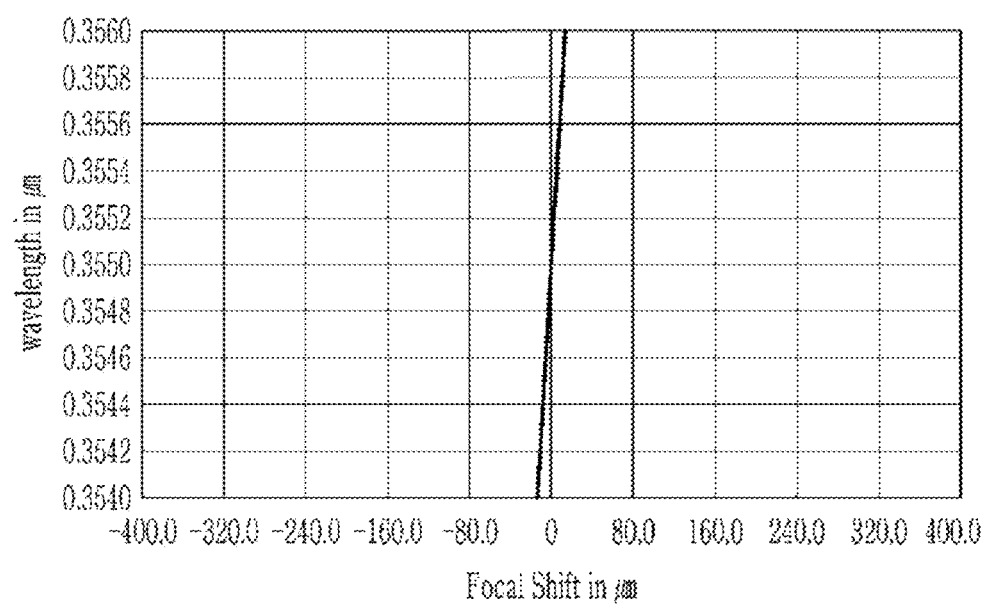
FIG. 16 is a graph showing a movement distance of a focal point depending on a wavelength of a laser beam of a laser processing apparatus according to an exemplary embodiment.

Next, FIG. 15 and FIG. 16 show the dependence of the position of the focal point on the wavelength of the laser beam irradiated by the laser processing apparatus according to a comparative example and an exemplary embodiment. Specifically, FIG. 15 is a graph showing a movement distance of a focal point depending on a wavelength of a laser beam of a laser processing apparatus using a transmissive lens according to a comparative example. By contrast, FIG. 16 is a graph showing a movement distance of a focal point depending on a wavelength of a laser beam of a laser processing apparatus according to an exemplary embodiment.

Referring to FIG. 15, in the case of the laser processing apparatus using a transmissive lens, a range of the focal point position of about 620 μm appears in the region where the wavelength is between 354 nm and 356 nm. This is due to the effect of the chromatic aberration when the laser beam passes through the lens.

Referring to FIG. 16, in the case of the laser processing apparatus according to an exemplary embodiment, there is a range of the focal point position of about 24 μm in the region where the wavelength is between 354 nm and 356 nm. In other words, the difference of the focal point position within a given wavelength range may be as low as ¹/₂₅ of that of a laser processing apparatus using a transmissive lens. Therefore, the effect of the chromatic aberration is very small.

As the pulse duration of a laser beam gets shorter, the spectral band width is widened. When a laser processing apparatus using a transmissive lens uses a laser beam having a short pulse duration, the precision of the laser processing apparatus is reduced (since the position of the focal point is highly dependent on the wavelength).

However, the laser processing apparatus according to the exemplary embodiment uses a small number of transmissive lenses. Therefore, the chromatic aberration effect of is very small. Even if a pulse type laser beam with a pulse duration of femtoseconds is used, the precision and processing quality of the laser processing apparatus may be improved because the position of the focal point is not highly dependent on the wavelength.

Next, the activation region 50 and the non-activation region 40 of the laser processing apparatus according to an exemplary embodiment are described with reference to FIG. 17 and FIG. 18.

Figure 17:
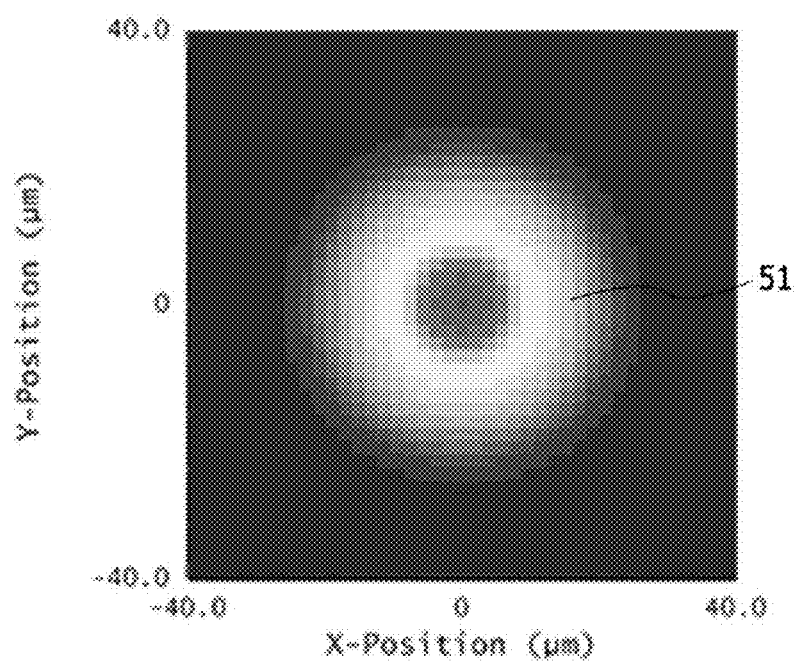
FIG. 17 is a view of an image representing a spot size of a laser beam irradiated to a center part of an object to be processed by a laser processing apparatus according to an exemplary embodiment.

FIG. 17 is a view of an image representing a spot size of a laser beam irradiated to a center part of an object to be processed by a laser processing apparatus according to an exemplary embodiment.

In a laser processing apparatus according to an exemplary embodiment, the composite optical element includes a central focusing hole at the center part, and the central focusing optical element is disposed under the composite optical element. Accordingly, it includes the center activation region 51 at which the focal point of the laser beam may be formed (i.e., at the center part of the object to be processed). The focal point of the laser beam may be formed at the center part of the object to be processed through FIG. 17.

Figure 18:
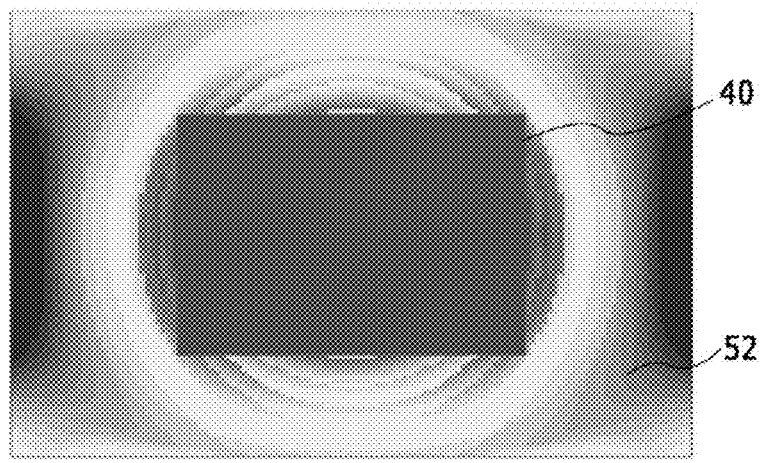
FIG. 18 is a view of an image representing a spot size distribution of a laser beam irradiated to a peripheral part of an object to be processed by a laser processing apparatus according to an exemplary embodiment.

FIG. 18 is a view of an image representing a spot size distribution of a laser beam irradiated to a peripheral part of an object to be processed by a laser processing apparatus according to an exemplary embodiment.

In the case of a laser processing apparatus using a transmissive lens, the laser beam is transmitted through the front of the lens, so the focal point may be formed on the front of the object to be processed. By contrast, the laser processing apparatus according to an exemplary embodiment includes a first region that does not transmit the laser beam in the composite optical element. This results in a non-activation region 40 within the partial region of the object to be processed where the laser beam does not reach.

The laser beam, having been reflected from the first recess portion of the through-hole optical element, is transmitted to the second region disposed at the peripheral part of the first region of the composite optical element to form the focal point. This results in a peripheral activation region 52 in which the focal point of the laser beam is formed in the region surrounding the non-activation region 40.

In the case of an optical system using a curved lens or a curved mirror, the distortion aberration occurs in which the image is distorted within a phase plane perpendicular to the optical axis. Correction of the distortion aberration may be performed by irradiating the laser beam with a checkered pattern, measuring a degree of distortion of the image, and compensating an error value with a galvano mirror.

Thus, in the case that the laser processing apparatus is unable to irradiate the laser beam to the center part of the object to be processed, the distortion aberration may not be corrected because there is no reference point to measure the degree of the distortion.

The laser processing apparatus, according to an exemplary embodiment, includes a central focusing hole at the center part of the composite optical element, and the central focusing optical element is disposed under the composite optical element. Accordingly, it is possible to irradiate the laser beam to the center part of the object to be processed. Therefore, the laser processing apparatus according to an exemplary embodiment can correct the distortion aberration while minimizing the effect of chromatic aberration.

Next, elements of a laser processing apparatus according to another exemplary embodiment are described with reference to FIG. 19 and FIG. 20. Parts of the description that are the same as the above-described description are omitted.

Figure 19:
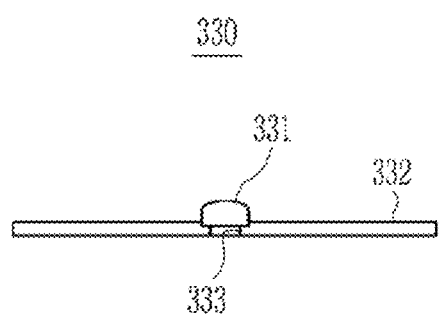
FIG. 19 is a cross-sectional view of a central focusing optical element of a laser processing apparatus according to another exemplary embodiment.

FIG. 19 is a cross-sectional view of a central focusing optical element 330 of a laser processing apparatus according to another exemplary embodiment.

Referring to FIG. 19, the central focusing optical element 330 includes the focusing lens 331, the supporting plate 332, and a central hole 333 formed in the supporting plate 332. In the focusing lens 331, the upper surface may be convex and the lower surface may be flat. Accordingly, the lower surface of the focusing lens 331 may be attached or fixed to the flat supporting plate 332. The central hole 333 is disposed in the region overlapping the focusing lens 331 in the supporting plate 332 to expose the lower surface of the focusing lens 331. The central hole 333 may be disposed within the region where the focusing lens 331 is disposed, and the diameter of the central hole 333 may be less than the diameter of the focusing lens 331.

Figure 20:
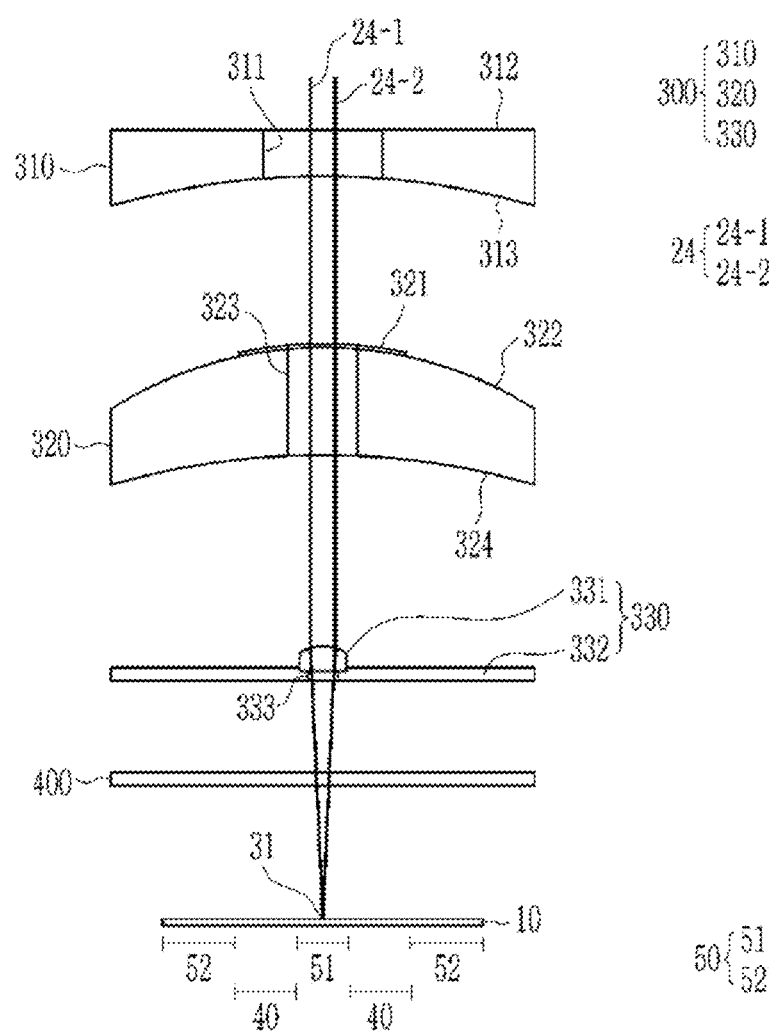
FIG. 20 is a diagram for explaining a light converging unit of a laser processing apparatus according to another exemplary embodiment.

A laser processing apparatus according to the exemplary embodiment shown in FIG. 20 may further include a window that prevents contamination of the focusing lens 331 exposed by the central hole 333 and protects the through-hole optical element 310, the composite optical element 320, and the focusing lens 331.

The path of the laser beam passing through the light converging unit 300 to form the focal point on the central activation region 51 will now be described with reference to FIG. 20.

FIG. 20 is a diagram for explaining a light converging unit of a laser processing apparatus according to another exemplary embodiment. FIG. 20 shows the path of a fourth laser beam 24 of which the path is adjusted to form the focal point on the focal point position 31 of the object to be processed 10.

Unlike the example shown in FIG. 13, the supporting plate 332 of the central focusing optical element 330 of the laser processing apparatus according to the present exemplary embodiment includes a central hole 333 and a window 400 and that is disposed under the central focusing optical element 330. The path of a fourth laser beam 24 forms a focal point 31 in the activation region 52 of the object to be processed 10. The path of a laser beam where the path is adjusted to form a focal point on the peripheral activation region 52 of the object to be processed 10 is the same as that described in FIG. 14, so the description thereof is omitted.

The path of the fourth laser beam 24 is described through the path of a seventh line beam 24-1 and an eighth line beam 24-2. The fourth laser beam 24 may include a group of numerous line beams, and the seventh line beam 24-1 and the eighth line beam 24-2 are described as examples.

The seventh line beam 24-1 and the eighth line beam 24-2 pass through the through-hole optical element 310 via the through hole 311. Next, the seventh line beam 24-1 and the eighth line beam 24-2 pass through the composite optical element 320 via the central focusing hole 323.

Since the through hole 311 and the central focusing hole 323 penetrate from the upper surface to the lower surface of the through-hole optical element 310 and the composite optical element 320, respectively, the seventh line beam 24-1 and the eighth line beam 24-2 proceed through the through hole 311 and the central focusing hole 323 without being refracted.

The seventh line beam 24-1 and the eighth line beam 24-2 then pass through the focusing lens 331 of the central focusing optical element 330. Since the focusing lens 331 is a convex lens of which the upper surface is convex, the seventh line beam 24-1 and the eighth line beam 24-2 pass through the focusing lens 331 and are concentrated to form the focal point.

Since the seventh line beam 24-1 and the eighth line beam 24-2 passing through the focusing lens 331 pass the supporting plate 332 through the central hole 333 formed in the supporting plate 332, even if the supporting plate 332 includes a different material from that of the focusing lens 331, the influence on the path of the laser beam by the supporting plate 332 may be minimized, enabling more precise processing.

In some embodiments, the supporting plate 332 and the focusing lens 331 may not be integrally formed but may include other material. However it is also possible for the supporting plate 332 and the focusing lens 331 to include the same material and to be integrally formed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF TERMS

10: object to be processed
20: laser beam
40: non-activation region

50: activation region
100: light source
200: position adjustment unit
300: light converging unit
310: through-hole optical element, first optical element
311: through hole
313: first recess portion
320: composite optical element, second optical element
321: first region
322: second region
323: central focusing hole
324: second recess portion
330: central focusing optical element, third optical element
331: focusing lens
332: supporting plate
333: central hole

What is claimed is:

1. A laser processing apparatus comprising:
a light source generating a first laser beam, a second laser beam, and a third laser beam; and
a light converging unit converging the first laser beam, the second laser beam, and the third laser beam to a first focal point, a second focal point, and a third focal point, respectively, in a plane perpendicular to a traveling direction of the first laser beam, wherein the first focal point is located in a central activation region and the second focal point and the third focal point are located in a peripheral activation region that surrounds the central activation region in the plane and are located on opposite sides of the first focal point in the plane,
wherein the light converging unit includes:
a first optical element including a through hole penetrating the first optical element;
a second optical element located after the first optical element in the traveling direction of the first laser beam and comprising a convex upper surface, a concave lower surface, and a central focusing hole aligned with the through hole of the first optical element, wherein the first laser beam passes through the through hole and the central focusing hole in a straight path from the first optical element to the central activation region, wherein the convex upper surface has a first radius of curvature and the concave lower surface has a second radius of curvature that is different from the first radius of curvature, wherein the convex upper surface includes a first region surrounding the central focusing hole in a plan view and reflecting the second laser beam and the third laser beam, and wherein the convex upper surface includes a second region surrounding the first region in the plan view and transmitting the reflected second and third laser beams; and
a third optical element located after the second optical element in the traveling direction of the first laser beam and comprising a focusing lens that focuses the first laser beam on to the first focal point after the laser beam passes through the central focusing hole and a third region surrounding the focusing lens in the plan view, wherein the second laser beam and the third laser beam pass through the third region,
wherein the light converging unit is configured to cause the first laser beam to pass through the central focusing hole and to converge at the first focal point, and
wherein the light converging unit is further configured to cause the second laser beam and the third laser beam to be reflected from the first region of the second optical element, then reflected from a lower surface of the first optical element, and then transmitted through the second region of the second optical element to converge at the second focal point and the third focal point, respectively.

2. The laser processing apparatus of claim 1, wherein the third optical element includes a supporting plate supporting the focusing lens.

3. The laser processing apparatus of claim 2, wherein a thickness of the supporting plate is uniform, and the supporting plate transmits the laser beams.

4. The laser processing apparatus of claim 3, wherein the central focusing hole comprises a smaller area than an area of the first region.

5. The laser processing apparatus of claim 4, wherein a size of the central focusing hole is smaller than a size of the through hole.

6. The laser processing apparatus of claim 5, further comprising
a position adjustment unit disposed on a path of the laser beams generated from the light source and adjusting an irradiation position of the laser beams on the plane,
wherein the position adjustment unit includes a first galvano mirror determining a position on an x-axis of the focal points on the plane and a second galvano mirror determining a position on a y-axis crossing the x-axis.

7. The laser processing apparatus of claim 6, wherein each of the laser beams is a pulse type laser having a pulse duration of femtoseconds.

8. The laser processing apparatus of claim 3, wherein the supporting plate includes a central hole exposing the focusing lens at a position overlapping the focusing lens.

9. The laser processing apparatus of claim 8, further comprising:
a window disposed between the light converging unit and the plane.

10. The laser processing apparatus of claim 1, wherein the light converging unit is not configured to cause the laser beams to follow any path directed to a non-activation region of the plane, and
the non-activation region surrounds the central activation region, and
the peripheral activation region surrounds the non-activation region.

11. The laser processing apparatus of claim 10, wherein a curvature of the first region and the second region of the second optical element is larger than a curvature of a lower surface of the second optical element.

12. The laser processing apparatus of claim 10, wherein a curvature of the first region and the second region of the second optical element is smaller than a curvature of the lower surface of the second optical element.

13. The laser processing apparatus of claim 10, wherein:
a curvature of the first region and the second region of the second optical element is equal to a curvature of the lower surface of the second optical element.

14. A laser processing apparatus comprising:
a first optical element including a through hole penetrating the first optical element;
a second optical element located after the first optical element in a traveling direction of a first laser beam and between the first optical element and a plane, wherein the second optical element comprises a convex upper surface, a concave lower surface, and a central focusing hole, wherein the first laser beam passes through the central focusing hole, wherein the convex upper surface has a first radius of curvature and the concave lower surface has a second radius of curvature that is different from the first radius of curvature, wherein the convex upper surface includes a first region surrounding the central focusing hole in a plan view and reflecting a second laser beam and a third laser beam, and wherein the convex upper surface includes a second region surrounding the first region in the plan view and transmitting the reflected second and third laser beams;

a third optical element located after the second optical element in the traveling direction of the first laser beam and comprising a focusing lens that focuses the first laser beam on to a first focal point after the laser beam passes through the central focusing hole and a third region surrounding the focusing lens in the plan view, wherein the second laser beam and the third laser beam pass through the third region, and the focusing lens disposed between the second optical element and the plane, wherein a lower surface of the first optical element is a concave mirror, a curvature center of an upper surface of the second optical element and a curvature center of a lower surface of the second optical element are disposed between the second optical element and the plane, the second optical element includes the central focusing hole penetrating the second optical element, wherein a first laser beam follows a first path that passes through the central focusing hole and to converge at a first focal point, the upper surface of the second optical element includes the first region comprising a reflective layer disposed on the second region, the first region reflecting the second laser beam and the third laser beam and the second region transmitting the second laser beam and the third laser beam to converge at a second focal point, and a third focal point, respectively, in a plane perpendicular to a traveling direction of the first laser beam, wherein the first focal point is located in the central activation region and the second focal point and the third focal point are located in a peripheral activation region that surrounds the central activation region in the plane and are located on opposite sides of the first focal point in the plane, and wherein the light converging unit is configured to avoid a focal point of a laser beam from being disposed within a non-activation region located between the central activation region and the peripheral activation region in the plane, wherein the lower surface of the second optical element transmits the second laser beam and the third laser beam, wherein a path of the second laser beam and the third laser beam is reflected from the first region of the second optical element, then reflected from the lower surface of the first optical element, and then transmitted through the second region of the second optical element to converge at the second focal point and the third focal point, respectively.

15. The laser processing apparatus of claim 14, further comprising
a supporting plate supporting the focusing lens, and
the supporting plate transmits the laser beams.

16. The laser processing apparatus of claim 15, wherein the supporting plate includes a central hole at a region overlapping the focusing lens.

17. The laser processing apparatus of claim 16, further comprising:
a position adjustment unit adjusting an irradiation position of the laser beams on the plane, and
the position adjustment unit includes a galvano mirror.

18. The laser processing apparatus of claim 17, wherein the central focusing hole is disposed within a region overlapping the through hole.

19. The laser processing apparatus of claim 18, further comprising
a window disposed between the supporting plate and the plane.

20. A laser processing method comprising:
generating, using a light source, a first laser beam, a second laser beam, and a third laser beam; and
focusing, using a light converging unit, the first laser beam on a first focal point, the second laser beam on a second focal point, and the third laser beam on a third focal point, wherein the first focal point is located in a central activation region and the second focal point and the third focal point are located in a peripheral activation region surrounding the central activation region in a plane and are located on opposite sides of the first focal point in the plane perpendicular to a traveling direction of the first laser beam, and a focal point of a laser beam is avoided from being disposed within a non-activation region located between the central activation region and the peripheral activation region in the plane,
wherein the first laser beam, the second laser beam, and the third laser beam pass through a through hole penetrating a first optical element of the light converging unit;
the first laser beam passes through a central focusing hole of a second optical element of the light converging unit aligned with and located after the first optical element in the traveling direction of the first laser beam;
the second laser beam and the third laser beam are reflected from a first region of a convex upper surface of the second optical element surrounding the central focusing hole toward a concave lower surface of the first optical element, then reflected from the concave lower surface of the first optical element through a second region of the convex upper surface of the second optical element surrounding the first region and through a concave lower surface of the second optical element;
the first laser beam passes through a focusing lens of a third optical element of the light converging unit located after the second optical element in the traveling direction of the first laser beam, wherein the first laser beam passes through the through hole and the central focusing hole in a straight path from the first optical element to the central activation region; and
the second and third laser beams pass through a third region of the third optical element surrounding the focusing lens.

* * * * *